United States Patent [19]

Kawamura

[11] Patent Number: 4,958,708
[45] Date of Patent: Sep. 25, 1990

[54] DRIVE SYSTEM FOR TURBOCHARGER WITH ROTARY ELECTRIC MACHINE

[75] Inventor: Hideo Kawamura, Koza, Japan
[73] Assignee: Isuzu Motors Limited, Tokyo, Japan
[21] Appl. No.: 356,231
[22] Filed: May 24, 1989
[30] Foreign Application Priority Data

Jun. 10, 1988 [JP] Japan .................................. 63-143091

[51] Int. Cl.⁵ ........................ F02B 37/00; B60K 41/02
[52] U.S. Cl. .................. 192/0.098; 192/0.07; 60/608
[58] Field of Search ............ 192/0.098, 0.096, 0.02 R, 192/0.032, 0.033, 0.07, 103 R; 60/607, 608

[56] References Cited

U.S. PATENT DOCUMENTS

| | | | |
|---|---|---|---|
| 3,869,866 | 3/1975 | Timoney | 60/608 |
| 4,798,257 | 1/1989 | Kawamura et al. | 60/608 |
| 4,833,887 | 5/1989 | Kawamura et al. | 60/608 |
| 4,850,193 | 7/1989 | Kawamura | 60/608 |

FOREIGN PATENT DOCUMENTS 0217537 3/1987 European Pat. Off. .
696111 9/1940 Fed. Rep. of Germany .
753944 10/1933 France .
495544 11/1938 United Kingdom ................. 60/608

OTHER PUBLICATIONS

Patent Abstracts of Japan, vol. 9, No. 290 (M-430) (2013), 16 Nov. 1985; & JP-A-60 128935 (Hitachi Zosen K.K.) 10.07.1985.
Patent Abstracts of Japan, vol. 4, No. 123 (M-29) (605), 30 Aug. 1980; & JP-A-55 81266 (Mitsubishi Jukogyo K.K.).

Primary Examiner—Richard Lorence
Assistant Examiner—Andrea Pitts
Attorney, Agent, or Firm—Staas & Halsey

[57] ABSTRACT

A drive system for a turbocharger installed in an internal combustion engine and combined with a rotary electric machine has a generator drivable by an output power of the engine. When the rotary electric machine operates as an electric motor depending on operating conditions of the engine, the generator is driven to generate electric power that is supplied to the rotary electric machine.

7 Claims, 1 Drawing Sheet

DRIVE SYSTEM FOR TURBOCHARGER WITH ROTARY ELECTRIC MACHINE

BACKGROUND OF THE INVENTION

1. Field of the Invention:

The present invention relates to a system for driving a turbocharger installed in an internal combustion engine mounted on a motor vehicle such as an automobile, and more particularly to a drive system for a turbocharger combined with a rotary electric machine which can operate as an electric motor depending on operating conditions of the internal combustion engine.

2. Description of the Related Art:

Japanese Laid-Open Patent Publication No. 62-48931 discloses a turbocharger installed in an internal combustion engine on a motor vehicle and having a turbine shaft on which there is mounted a rotary electric machine that can operate alternatively as either an electric motor or a generator. The rotary electric machine is controlled to operate as the motor or the generator based on a signal indicative of the load on the engine and a signal indicative of the rotational speed of the engine. According to this known device when the engine is subjected to a partial load, the rotary electric machine is operated as the generator, and generated electric power is used to charge a battery. When the engine rotates at a low speed while under a high load, stored electric power is supplied from the battery to the rotary electric machine to operate the latter as the motor. The rotation of the turbocharger caused by the energy of exhaust gases from the engine is now assisted to increase the boost pressure for enabling the engine to produce a higher output power at the low engine speed under the high engine load.

A large amount of electric power is required to drive the rotary electric machine. When the engine operates at a low speed, especially if the engine is a gasoline engine, since the energy of emitted exhaust gases is small, a large amount of electric power must be supplied from the battery to drive the turbocharger sufficiently to assist it in supercharging the engine. Accordingly, the voltage of the battery tends to drop largely to the point where various electric parts on the motor vehicle may not be energized, and the battery may have a short service life.

SUMMARY OF THE INVENTION

It is an object of the present invention to provide a system for driving a turbocharger installed in an internal combustion engine and combined with a rotary electric machine, the system including a generator which, when the rotary electric machine operates as an electric motor to assist in rotating the turbocharger, is drivable by the engine to generate electric power that is supplied to the rotary electric machine.

Another object of the present invention is to provide a system for driving a turbocharger installed in an internal combustion engine and combined with a rotary electric machine, the rotary electric machine being drivable by electric power stored in a battery and electric power generated by a generator drivable by the engine, the system including means which, when the rotary electric machine operates as an electric motor to assist in rotating the turbocharger, drives the generator, if the voltage of the battery drops below a predetermined level, to generate electric power that is supplied to the rotary electric machine.

According to the present invention, there is provided a system for driving a turbocharger installed in an internal combustion engine and combined with a rotary electric machine, comprising a rotary electric machine mounted on a rotatable shaft of the turbocharger, a generator drivable by an output power of the engine, a clutch disposed between the generator and the engine for selectively applying and cutting off the output power of the engine to the generator, means for driving the rotary electric machine as an electric motor depending on a operating condition of the engine, means for engaging the clutch to drive the generator when the rotary electric machine is operated as the motor, and means for supplying electric power generated by the generator to the rotary electric machine.

According to the present invention, there is also provided a system for driving a turbocharger installed in an internal combustion engine and combined with a rotary electric machine, comprising a rotary electric machine mounted on a rotatable shaft of the turbocharger, a battery for storing electric power to be supplied to the rotary electric machine, means for supplying the electric power from the battery to the rotary electric machine, means for detecting a voltage across the battery, a generator drivable by an output power of the engine, a clutch disposed between the generator and the engine for selectively applying and cutting off the output power of the engine to the generator, means for driving the rotary electric machine as an electric motor depending on an operating condition of the engine, means for engaging the clutch to drive the generator if the voltage across the battery is lower than a predetermined level when the rotary electric machine is operated as the motor, and means for supplying electric power generated by the generator to the rotary electric machine.

The above and other objects, features and advantages of the present invention will become more apparent from the following description when taken in conjunction with the accompanying drawings in which a preferred embodiment of the present invention is shown by way of illustrative example.

BRIEF OF THE DRAWINGS

FIG. 1 is a block diagram of a drive system for a turbocharger with a rotary electric machine according to the present invention; and FIG. 2 a schematic view showing the relationship between an engine and a turbocharger in the system of the present invention.

DETAILED DESCRIPTION OF THE PREFERRED EMBODIMENT

Figure 1:
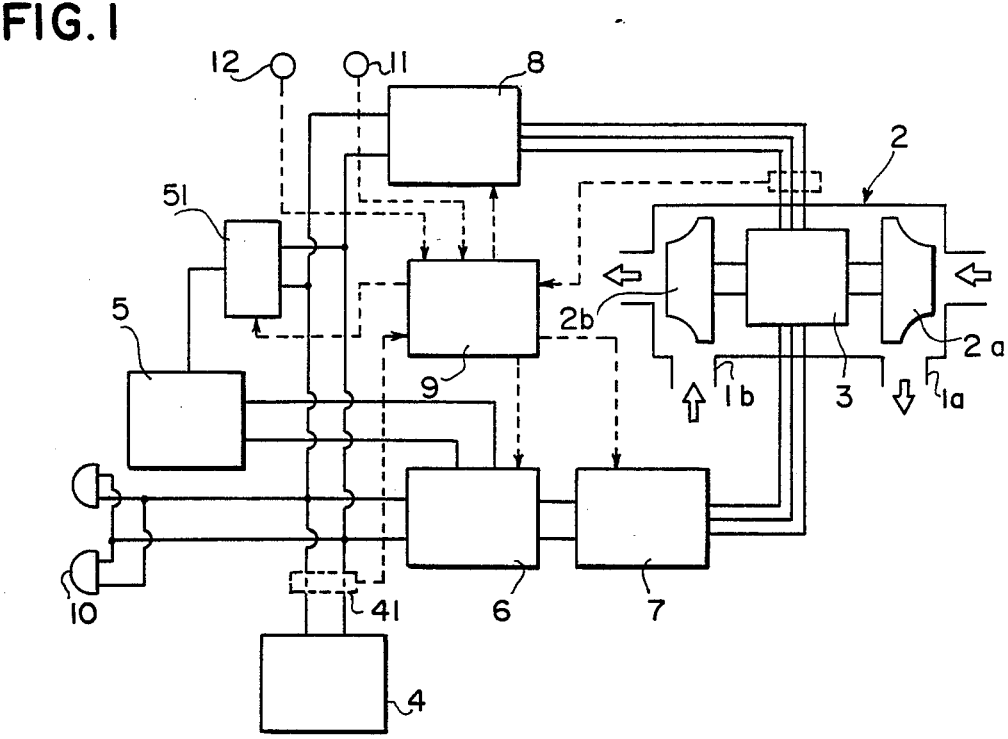
Figure 2:
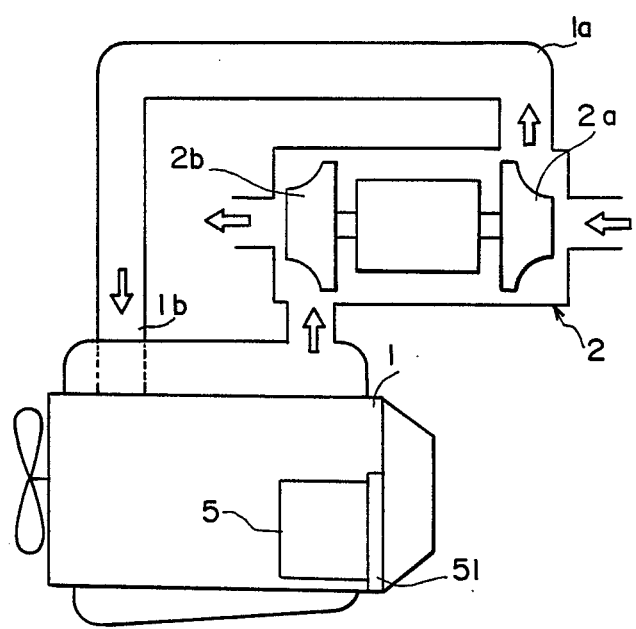

As shown in FIGS. 1 and 2, an internal combustion engine 1 mounted on a motor vehicle such as an automobile is operated by the combustion energy of air drawn through an intake pipe 1a and fuel supplied to the engine to drive the motor vehicle. Exhaust gases from the engine 1 are discharged through an exhaust pipe 1b.

A turbocharger 2 is coupled to the engine 1 through the intake pipe 1a and the exhaust pipe 1b. The turbocharger 2 has a compressor 2a for compressing air to be supplied to the engine 1, and a turbine 2b drivable by the exhaust energy from the engine 1. The compressor 2a and the turbine 2b are axially connected to each other by a rotatable shaft on which a rotary electric machine 3 is mounted.

When the turbine 2b is rotated by the exhaust energy from the engine 1, the compressor 2a coaxial therewith is driven to compress intake air, and the compressed intake air is supplied through the intake pipe 1a into the engine 1 to enable the engine 1 to produce an increased output power.

The rotary electric machine 3 comprises a rotor composed of permanent magnets having strong residual magnetic forces, and a stator having polyphase windings. When AC electric power is supplied to the polyphase windings, the rotary electric machine 3 is operated as an electric motor to rotate the compressor 2a to assist the turbocharger 2 in supercharging the engine 1. When the exhaust energy of the engine is intensive, the rotation of the rotor coaxial with the turbine 2b causes a change in the magnetic flux to induce AC electric power in the polyphase windings of the stator. The induced AC electric power is then rectified to charge a battery 4. The voltage of electric power generated by the rotary electric machine 3 is detected by a voltage sensor 31. The voltage across the battery 4 is detected by a voltage sensor 41. Detected output signals from this voltage sensor 41 is applied to a controller 9 (described later on).

A generator 5 is operatively coupled to the engine 1 through a clutch 51 serving as a means for controlling the transmission of power from the engine 1. The generator 5 thus converts part of the mechanical power of the engine 1 to DC electric energy. When the engine 1 rotates at a low speed under a high load, and the boost pressure of the turbocharger 2 should be increased, the electric power generated by the engine 1 is supplied to the rotary electric machine 3 to assist the turbocharger 2 in supercharging the engine 1. The clutch 51 comprises an electromagnetic clutch which, when energized, transmits the engine power to the generator 5. The clutch 51 can be engaged and disengaged by a command signal from the controller 9.

A voltage converter 6 has a switching circuit composed of semiconductor control elements, a boosting transformer, and a rectifier. The voltage converter 6 serves to increase the voltage of the DC electric power supplied from the generator 5.

An inverter 7 is connected to the voltage converter 6 to convert the DC electric power from the voltage converter 6 to AC electric power having a prescribed frequency for driving the rotary electric machine 3. The voltage converter 6 and the inverter 7 are controlled in operation by control commands from the controller 9.

A regulator 8 converts AC electric power generated by the rotary electric machine 3 operating as a generator, to DC electric power used to charge the battery 4. The voltage and current of DC electric power produced by the regulator 8 are controlled by a control command from the controller 9. Headlights 10, shows as one example of a vehicle-mounted electric component are supplied with electric power from the battery 4.

The speed of rotation of the engine 1 is detected by an engine speed sensor 11. The depth to which an accelerator pedal of the engine is depressed is detected by an accelerator pedal movement sensor 12. Detected output signals from these sensors 11, 12 are delivered to the controller 9.

The controller 9 comprises a microcomputer, for example, and has a central processing unit, a memory, and an input/output circuit. The controller 9 is responsive to operating conditions of the engine 1, operating conditions of the rotary electric machine 3, and a signal from the voltage sensor 41 for issuing control commands respectively to the clutch 51, the voltage converter 6, the inverter 7, and the regulator 8 according to a control program stored in the memory.

Operation of the drive system having the aforesaid construction will be described below.

(1) When the engine 1 operates, the turbine 2b of the turbocharger 2 is driven by the energy of discharged exhaust gases to operate the compressor 2a to compress intake air and supply supercharging air into the engine 1. If the engine requires a high output power as when the motor vehicle goes uphill, e.g., it runs at a low speed under a high load, the engine 1 cannot sufficiently be supercharged only by the turbocharger 2 since the exhaust energy from the engine 1 is small particularly if the engine 1 is a gasoline engine.

The controller 9 receives an output signal from the engine speed sensor 11 and an output signal from the accelerator pedal movement sensor 12, and determines that the engine operates at a low speed under a high load based on the received output signals. Then, the controller 9 controls the voltage converter 6 and the inverter 7 to supply electric power from the battery 4 to the rotary electric machine 3 for thereby operate the rotary electric machine 3 as a motor to increase the boost pressure. Because the electric power supplied to the rotary electric machine 3 is large, the voltage across the battery 4 then starts dropping. If the controller 9 detects that the battery voltage drops below a predetermined level based on the voltage signal from the voltage sensor 41, then the controller 9 generates a control command to engage the clutch 51 to connect the generator 5 to the engine 1, whereupon the generator 5 is operated to generate electric power. The controller 9 also controls the voltage converter 6 and the inverter 7 to converter DC electric power generated by the generator 5 to AC electric power having a prescribed voltage and frequency. The AC electric power produced from the inverter 7 is then supplied to the rotary electric power 3. The rotary electric machine 3 assists in rotating the compressor 2a to increase the boost pressure to supply compressed intake air to the engine 1, which thus produces an increased output power.

If the engine is determined by the controller 9 as operating at a low speed under a high load or as requiring a motor vehicle acceleration based on the detected signals from the engine speed sensor 11 and the accelerator pedal movement sensor 12, then the controller 9 may drive the generator 5 regardless of the battery voltage.

(2) While the motor vehicle is running at a high speed, the energy of exhaust gases discharged from the engine 1 is sufficiently high, and it is not necessary to supply electric power to the rotary electric machine 3 for supercharging the engine 1. Since the voltage across the battery 4 is of a normal level and the detected signal from the voltage sensor 41 is of a normal value, the controller 9 generates a control command to disengage the clutch 51 to disconnect the generator 5 from the engine 1. The rotary electric machine 3 on the turbocharger 2 is now operated as a generator to generate AC electric power which is rectified into DC electric power by the regulator 8. The rectified DC electric power is supplied to the battery 4 to charge the same.

With the present invention, as described above, the generator 5 drivable by the output power of the engine 1 is operatively coupled to the engine 1 through the clutch 51. When the engine operates at a low speed under a high load, the clutch 51 is engaged to operate the generator 5 to enable the same to generate electric power. The generated electric power is supplied to the rotary electric machine 3 to assist the turbocharger 2 in supercharging the engine 1. Therefore, it is not necessary for the battery 4 to supply stored electric power to the rotary electric machine 3, and hence the battery voltage is prevented from unduly dropping. Any electric components on the motor vehicle are therefore prevented from suffering an operation failure which would otherwise be caused by a battery power shortage. The battery thus stores a sufficient amount of electric power, and its service life is not shortened.

Although a certain preferred embodiment has been shown and described, it should be understood that many changes and modifications may be made therein without departing from the scope of the appended claims.

What is claimed is:

1. A system for driving a turbocharger installed in an internal combustion engine and combined with a rotary electric machine, comprising:
    a rotary electric machine mounted on a rotatable shaft of the turbocharger;
    a generator drivable by an output power of the engine;
    a clutch disposed between said generator and the engine for selectively applying and cutting off the output power of the engine to said generator;
    means for driving said rotary electric machine as an electric motor depending on an operating condition of the engine;
    means for engaging said clutch to drive said generator when said rotary electric machine is operated as the motor; and
    means for supplying electric power generated by said generator to said rotary electric machine,
    wherein said generator comprises a DC generator, said means for supplying electric power to said rotary electric means having a voltage converter for increasing the voltage of DC electric power generated by said DC generator, and an inverter for converting the DC electric power with the voltage increased by said voltage converter to AC electric power having a predetermined frequency and supplying the AC electric power to said rotary electric machine.

2. A system according to claim 1, wherein said clutch comprises an electromagnetic clutch.

3. A system for driving a turbocharger installed in an internal combustion engine and combined with a rotary electric machine, comprising:
    a rotary electric machine mounted on a rotatable shaft of the turbocharger;
    a battery for storing electric power to be supplied to said rotary electric machine;
    means for supplying the electric power from said battery to said rotary electric machine;
    means for detecting a voltage across said battery;
    a generator drivable by an output power of the engine;
    a clutch disposed between said generator and the engine for selectively applying and cutting off the output power of the engine to said generator;
    means for driving said rotary electric machine as an electric motor depending on an operating condition of the engine;
    means for engaging said clutch to drive said generator if the voltage across said battery is lower than a predetermined level when said rotary electric machine is operated as the motor; and
    means for supplying electric power generated by said generator to said rotary electric machine.

4. A system according to claim 3, wherein said generator comprises a DC generator, said means for supplying electric power to said rotary electric machine having a voltage converter for increasing the voltage of DC electric power generated by said DC generator, and an inverter for converting the DC electric power with the voltage increased by said voltage converter to AC electric power having a predetermined frequency and supplying the AC electric power to said rotary electric machine, whereby the electric power generated by said DC generator is supplied through said voltage converter and said inverter to said rotary electric machine.

5. A system for driving a turbocharger installed in an internal combustion engine and combined with a rotary electric machine, comprising:
    a rotary electric machine mounted on a rotatable shaft of the turbocharger;
    a generator drivable by an output power of the engine;
    a clutch disposed between said generator and the engine for selectively applying and cutting off the output power of the engine to said generator;
    means for detecting a speed of rotation of said engine;
    means for detecting a load on said engine;
    means for driving said rotary electric machine as an electric motor if the engine is determined as operating at a low speed under a high load based on detected signal from both of said detecting means;
    means for engaging said clutch to drive said generator when said rotary electric machine is operated as the motor; and
    means for supplying electric power generated by said generator to said rotary electric machine,
    wherein said generator comprises a DC generator, said means for supplying electric power to said rotary electric means having a voltage converter for increasing the voltage of DC electric power generated by said DC generator, and in inverter for converting the DC electric power with the voltage increased by said voltage converter to AC electric power having a predetermined frequency and supplying the AC electric power to said rotary electric machine.

6. A system for driving a turbocharger installed in an internal combustion engine and combined with a rotary electric machine, comprising:
    a rotary electric machine mounted on a rotatable shaft of the turbocharger;
    a battery for storing electric power to be supplied to said rotary electric machine;
    means for supplying the electric power from said battery to said rotary electric machine;
    means for detecting a voltage across said battery;
    a generator drivable by an output power of the engine;
    a clutch disposed between said generator and the engine for selectively applying and cutting off the output power of the engine to said generator;
    means for detecting a speed of rotation of said engine;
    means for detecting a load on said engine;

means for driving said rotary electric machine as an electric motor if the engine is determined as operating at a low speed under a high load based on detected signals from both of said detecting means;

means for engaging said clutch to drive said generator if the voltage across said battery is lower than a predetermined level when said rotary electric machine is operated as the motor; and means for supplying electric power generated by said generator to said rotary electric machine.

7. A system according to claim 6, wherein said generator comprises a DC generator, said means for supplying electric power to said rotary electric machine having a voltage converter for increasing the voltage of DC electric power generated by said DC generator, and an inverter for converting the DC electric power with the voltage increased by said voltage converter to AC electric power having a predetermined frequency and supplying the AC electric power to said rotary electric machine, whereby the electric power generated by said DC generator is supplied through said voltage converter and said inverter to said rotary electric machine.

* * * * *

UNITED STATES PATENT AND TRADEMARK OFFICE
CERTIFICATE OF CORRECTION

PATENT NO. : 4,958,708

DATED : September 25, 1990

INVENTOR(S) : Hideo Kawamura

It is certified that error appears in the above-identified patent and that said Letters Patent is hereby corrected as shown below:

On the title page, in item [75], change "Koza" to --Koza-gun--.

Col. 1, line 25, change "device" to --device,--.

Signed and Sealed this

Twenty-first Day of January, 1992

Attest:

HARRY F. MANBECK, JR.

*Attesting Officer*    *Commissioner of Patents and Trademarks*